UNITED STATES PATENT OFFICE.

E. G. KEARSING, OF NEW YORK, N. Y.

IMPROVED METHOD OF PREPARING GOLD FOR DENTAL PURPOSES.

Specification forming part of Letters Patent No. 51,459, dated December 12, 1865.

*To all whom it may concern:*

Be it known that I, EDWARD G. KEARSING, of the city, county, and State of New York, have invented a new and useful Improvement in Preparing Gold for Dental Purposes; and I do hereby declare that the following is a full, clear, and exact description thereof, which will enable those skilled in the art to make and use the same.

For the purpose of filling teeth and other similar purposes gold has to be prepared in a peculiar manner, and this object is usually accomplished by precipitating the gold in a finely-divided state by the action of chemicals. The operation of precipitating the gold, however, requires great skill and attention, and furthermore some of the acids or chemicals used in the operation are liable to adhere to it, causing it to tarnish after a short time. These disadvantages are avoided by this present invention, which consists in beating the gold in fine leaves and molding it in a cake by squeezing or other mechanical means; or, instead of this, it may be cut up in fine pieces and mixed with honey, molasses, or other suitable adhesive substance, and in this state formed into cakes of the required size and weight.

By the operation of beating gold can be reduced to a foil of such fineness that the same rolled up and squeezed in a mold of glass or other suitable material forms into a cake which, when annealed, forms an apparently homogeneous solid mass. From this cake the required quantities are weighed off, as desired.

By using honey or other adhesive material together with the gold-foil the formation of the cake can be facilitated.

I claim as new and desire to secure by Letters Patent—

1. A cake prepared from gold-foil, substantially as and for the purpose described.

2. Preparing gold for dental purposes by beating it out in thin leaves and grinding or cutting it up, in combination with molasses, honey, or other suitable materials, substantially as herein set forth.

E. G. KEARSING.

Witnesses:
M. M. LIVINGSTON,
C. L. TOPLIFF.